US005580251A

United States Patent [19]
Gilkes et al.

[11] Patent Number: 5,580,251
[45] Date of Patent: Dec. 3, 1996

[54] ELECTRONIC REFRESHABLE TACTILE DISPLAY FOR BRAILLE TEXT AND GRAPHICS

[75] Inventors: Alan M. Gilkes; Marvin W. Cowens, both of Plano; Larry A. Taylor, North Richland Hills, all of Tex.

[73] Assignee: Texas Instruments Incorporated, Dallas, Tex.

[21] Appl. No.: 509,946

[22] Filed: Aug. 1, 1995

Related U.S. Application Data

[63] Continuation of Ser. No. 286,108, Aug. 4, 1994, abandoned, which is a continuation of Ser. No. 95,634, Jul. 21, 1993, abandoned.

[51] Int. Cl.$^6$ ..................................................... G09B 21/00
[52] U.S. Cl. ........................ 434/113; 434/112; 340/407.1
[58] Field of Search ..................................... 434/112, 113, 434/114, 115; 340/407.1, 825.14; 252/71, 73, 74, 75; 40/406, 407

[56] References Cited

U.S. PATENT DOCUMENTS 4,266,936  5/1981  Rose et al. .
5,222,895  6/1993  Fricke ........................................ 340/407

OTHER PUBLICATIONS

Intelligent Gels, Yoshihito Osada, et al. Scientific American, May 1993, pp. 82–87.
Gels, Toyoichi Tanaka, Scientific American, 1991, pp. 124–138.

Primary Examiner—Curtis Kuntz
Assistant Examiner—Vivian W. Chang
Attorney, Agent, or Firm—Ruben C. DeLeon; James C. Kesterson; Richard L. Donaldson

[57] ABSTRACT

This is a Braille display device which comprises: a plurality of cavities; and circuitry to individually excite the plurality of cavities. The plurality of cavities contain a positive and a negative electrode 18, 22, 26 and are filled with a quantity of polar organic gel 24 sensitive to electric fields. The cavities are sealed by an elastomeric film 14. The elastomeric film is held generally flat, by its own tension, in the absence of any voltage applied to the electrodes 18, 22, 26 in the plurality of cavities. The display device can also include circuitry to determine whether the cavity has been touched by person who is reading the display. The display device can also include circuitry to individually vibrate each cavity. Other devices, systems and methods are also disclosed.

11 Claims, 3 Drawing Sheets

RAISED DOT•
FLAT DOT·

RAISED DOT •
FLAT DOT .

ELECTRONIC REFRESHABLE TACTILE DISPLAY FOR BRAILLE TEXT AND GRAPHICS

This application is a Continuation of application Ser. No. 08/286,108, filed Aug. 4, 1994, now abandoned, which is a Continuation of application Ser. No. 08/095,634, filed Jul. 21, 1993, now abandoned.

FIELD OF THE INVENTION

This invention generally relates to electronic refreshable tactile displays for Braille text and graphics for the blind.

BACKGROUND OF THE INVENTION

Without limiting the scope of the invention, its background is described in connection with Braille display readers.

It has been estimated that, as of 1990, there were 4.3 million severely visually impaired persons in America. Of these, 12% (515,000) were "blind in both eyes" and therefore unable to use devices or computer software for magnifying images.

Over the years many aids have been developed for blind people to compensate for their lack of visual reading ability. Of these many aids, the most well known and most widely used is Braille. In standard literary Braille, letters are represented by embossed characters made up of from one to six dots arranged in a configuration of two columns of three dots each. An 8 dot Braille system (2 columns of 4 dots) has also been developed, to comprehend mathematical symbols and to permit compatibility with the ASCII character set. A blind reader usually touches Braille characters with his fingers to identify the letters and words which he "reads". Since Braille was first developed by Louis Braille in 1825, many blind persons have learned to read Braille. Therefore, dissemination of Braille texts and instructions for everyday necessities would enable Braille readers to communicate to the rest of the world. Numerous texts have already been transcribed into Braille, however, there are presently significant problems with providing and disseminating large numbers of Braille copies of textual material due to several factors. Braille literacy translates to employability; According to the American Foundation for the Blind (AFB), 85% of those using Braille as their primary method of reading are employed (Spungin, S. J., *Braille Literacy-Issues for Blind Persons, Families, Professionals, and Producers of Braille.* Brochure published by the American Foundation for the Blind.).

However, Braille literature in hard-copy form requires expensive printers and much more storage space than other literature, because of its bulk. An authority has also stated that the tactile readability of Braille hard-copies may begin to deteriorate after as few as 3 tactile readings.

Several systems have been developed which electronically store data representative of Braille characters and reproduce that data for a blind reader. All previous systems, however, have suffered from the drawback that they can only reproduce from a few characters to, at most, a single line of Braille. It is frequently desirable for both sighted and sightless readers to refer back to previous material on a page or on a previous page. This is especially important, of course, when studying complicated subjects. Examples of this are charts, tables, musical, and mathematical materials. Electronic Braille reproduction devices which provide only a single line do not allow a Braille reader to easily refer back to previous material or to deal with tabular or multi-line materials. Whereas in a conventional Braille book, a blind reader may skim or quickly look for previous material by reading a line or two on a page to determine the location of that material, currently available electronic Braille reproduction devices which display only a single line at a time make such reference back to previous material confusing, difficult, and time consuming. It has also been found that a Braille reader reads much more slowly when presented with a single line at a time in comparison with the speed at which the full pages of Braille books may be read.

Currently, refreshable Braille displays are usually made using either piezoelectric or electromechanical (solenoid) technologies. Typically, the products of these technologies are prohibitively expensive sources of Braille text (e.g., 1 line of 80 8-dot Braille characters for $13,000 to $15,000). Graphical (i.e., non-textual) information is not generally available either in hard-copy or refreshable form. Therefore, most blind people, even if they are literate, now rely on being read to by humans, by prerecorded audio tapes (if available), or by one of two kinds of devices with electronically synthesized speech: screen readers installed in PCs, or stand-alone scanner-OCR-readers.

SUMMARY OF THE INVENTION

Accordingly, improvements which overcome any or all of the problems are presently desirable.

This invention makes feasible a low-cost large-scale refreshable tactile display that can simultaneously display multiple lines of Braille text and dot graphics in bas-relief form.

This invention consists of a matrix of small cavities, each containing a positive and a negative electrode, and filled with a small quantity of polar organic gel sensitive to electric fields. A thin elastomeric film tightly seals each cavity, so that the top of each cavity is held generally flat, by its own tension, in the absence of any voltage applied to the electrodes in the cavities. Each cavity is individually addressable by electronic means. When voltage is applied to the electrodes in a cavity, the gel in that cavity expands sufficiently to raise a dimple in the elastomeric film.

Several advantages derive from the low cost and programmability of this invention, when implemented in any of several possible hardware configurations. The Americans with Disabilities Act (ADA) and the legal concept of reasonable accommodation accentuate the advantage of low cost. To some degree, the law compels businesses, schools, universities, libraries, etc., to recognize this invention as de facto a reasonable accommodation; it is a low-cost alternative to devices that, up to now, have been prohibitively expensive. The number of organizations, buildings, devices, etc. which must accommodate Braille readers probably exceeds the number of Braille readers to be accommodated. Further, the ADA Accessibility Guidelines for Buildings and Facilities (Americans with Disabilities Act (ADA) Accessibility Guidelines for Buildings and Facilities. Federal Register, Vol. 56, No. 144, Friday, Jul. 26, 1991, p.58.) require the following of at least one of the ATM machines placed in any new building (para. 4.34.4): "Instructions and all information for use shall be made accessible to and independently usable by persons with vision impairments." This invention, in the form of a small, text-only display, can serve as Braille output for an ATM machine. This invention, in the form of a full page Braille-and-graphics display, can attach to a classroom, library or office computer, so that both a blind and a sighted user have their respective "CRT"s.

Braille "CRTs" enable a blind person to work as a word processor because of the capability to proofread typed material immediately. Additionally, using both Braille and tactile graphics, a blind person can work with spreadsheets and associated graphs. Furthermore, a blind person can immediately access CD-ROM literature, electronic mail, and on-line data bases.

This same kind of display can also serve as a stand-alone output device for scanner-OCR systems, thereby making conventionally-printed books and magazines immediately accessible to Braille readers. In this stand-alone role, the invention has additional potential as a home appliance, as well as a tool for businesses, schools and libraries. In each of these applications, the blind are actively exercising and improving their literacy, rather than being read to by a human or a speech synthesizer. However, it is conceivable that integrating a speech synthesizer with this invention may enhance its attractiveness to many users.

These are just some of the numerous opportunities that will arise for a Braille reading person.

This is a Braille display device which comprises: a plurality of cavities; and circuitry to individually excite the plurality of cavities. The plurality of cavities contain a positive and a negative electrode and are filled with a quantity of polar organic gel sensitive to electric fields. The cavities are sealed by an elastomeric film. The elastomeric film is held generally flat, by its own tension, in the absence of any voltage applied to the electrodes in the plurality of cavities. The display device can also include circuitry to determine whether the cavity has been touched by the person who is reading the display. (e.g. to turn pages, or to determine what characters have been read.) The display device can also include circuitry to individually vibrate each cavity.

BRIEF DESCRIPTION OF THE DRAWINGS

The foregoing and further aspects of the invention are illustrated in the accompanying drawings wherein like elements are denoted by like reference designators and in which.

DETAILED DESCRIPTION OF PREFERRED EMBODIMENTS

Figure 1:
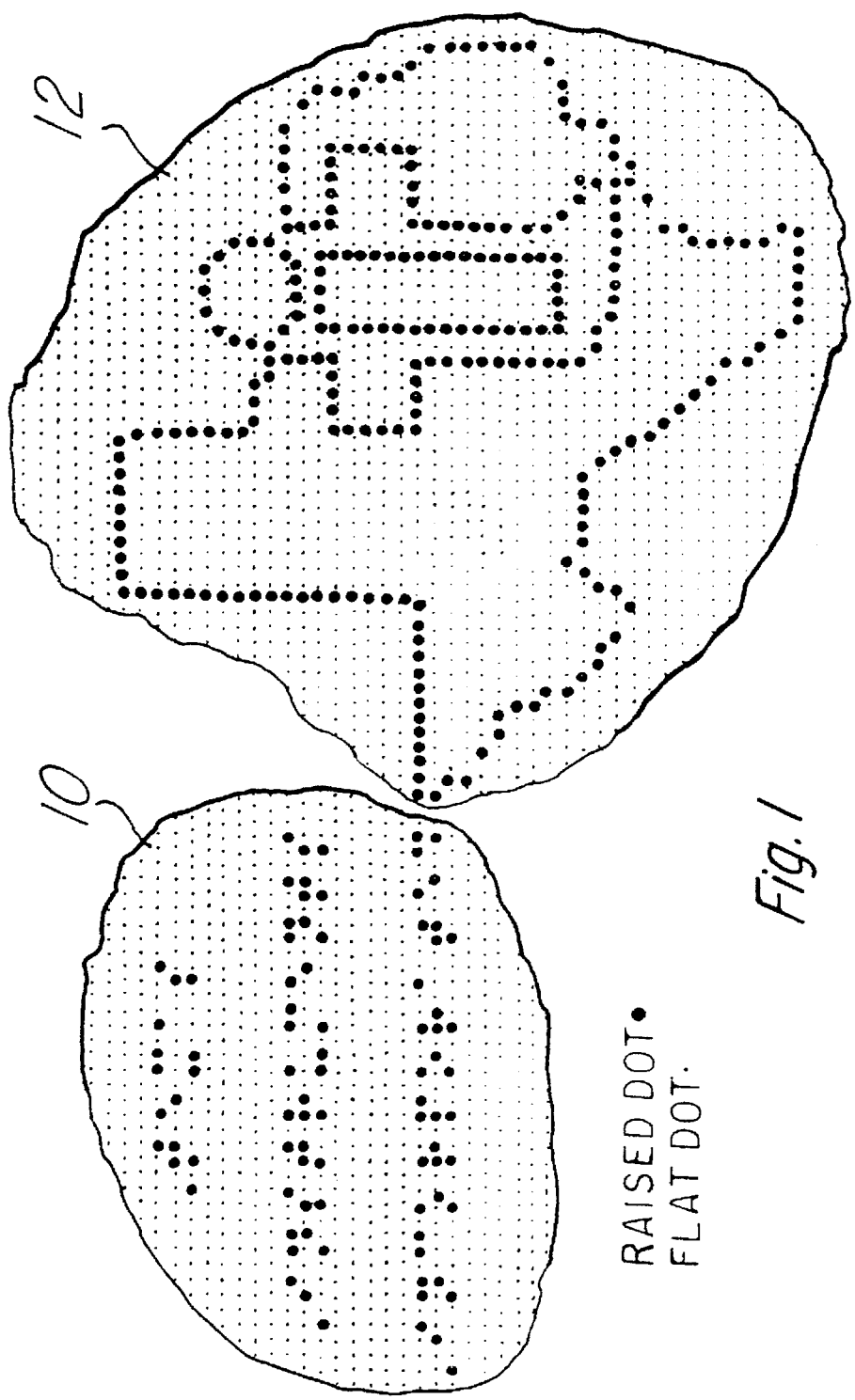
FIG. 1 is a diagram of a Braille text and graphics display.

FIG. 1 shows a Braille text and bas-relief dot graphical display. The Braille dots 10 translate to "Texas Instruments Incorporated" in Grade 1 Braille. Even though the present invention is described using Grade 1 English, the invention can be used as well with Grade 2 English and other languages as well. The Texas Instruments trademark 12 is also shown in the FIG. 1. The pattern, size and spacing of the raised dimples correspond to Braille characters or to graphical images rendered in bas-relief. The ANSI and U.S. government standard diameter of a single Braille dot is 1.5 mm., although the present invention can be used with other sizes as well.

Figure 2:
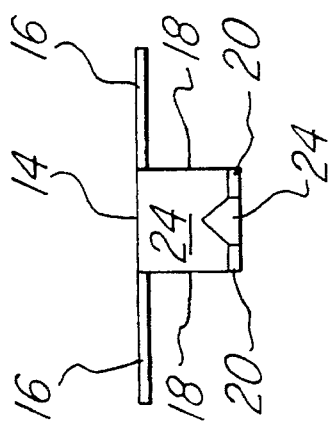
FIG. 2 is a cross-sectional side view of a first embodiment of a cylindrical gel cavity.

FIG. 2 shows a cross-section of a cavity design considered to be one of the most cost-effective embodiments. Each cavity 24 is cylindrical, with a metallic side wall 18 serving as one electrode and another metal object 22 attached to the floor of the cavity as the other electrode. The gel cavity 24 is about 1.5 mm in diameter and about 1.0 mm in depth. An insulator 16 surrounds the cavity on the surface. The electrode attached to the floor of the cavity is a flat metal disc 22 surrounded by an insulator 20. A thin elastomeric film 14 tightly seals each cavity, so that the top of each cavity is held generally flat, by its own tension, in the absence of any voltage applied to the electrodes in the cavities.

Figure 3:
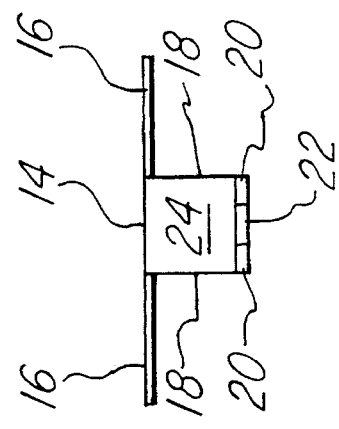
FIG. 3 is a cross-sectional side view of a second embodiment of a cylindrical gel cavity.

FIG. 3 shows a cross-section of another cavity design considered to be one of the most cost-effective embodiments. The design is similar to that depicted in FIG. 2. Each cavity 24 is cylindrical, with a metallic side wall 18 serving as one electrode and another metal object 26 attached to the floor of the cavity as the other electrode. The gel cavity 24 is about 1.5 mm in diameter and about 1.0 mm in depth. An insulator 16 surrounds the cavity on the surface. The electrode attached to the floor of the cavity is cone-shaped 26 surrounded by an insulator 20. A thin elastomeric film 14 tightly seals each cavity, so that the top of each cavity is held generally flat, by its own tension, in the absence of any voltage applied to the electrodes in the cavities.

The designs were chosen because of the low-cost of manufacture and the effects of their electric fields on the gel they contain.

Figure 4:
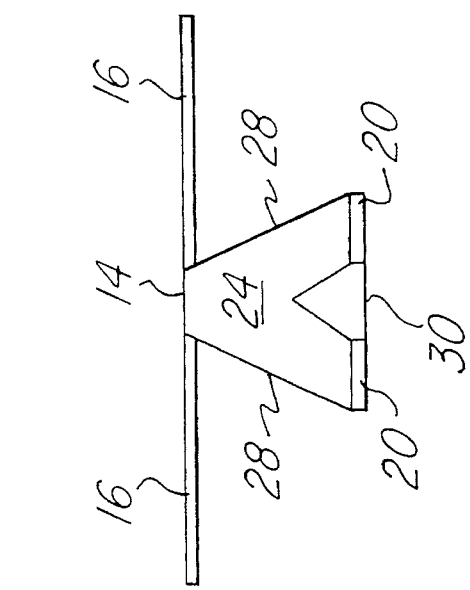
FIG. 4 is a cross-sectional side view of a third embodiment of a gel cavity.

FIG. 4 illustrates a modification to the design of the cavity. The cavity 24 is smaller at the top than at the bottom, with a metallic side wall 28 serving as one electrode and another metal object 30 attached to the floor of the cavity as the other electrode. An insulator 16 surrounds the cavity on the surface. The electrode attached to the floor of the cavity is cone-shaped 30 surrounded by an insulator 20. A thin elastomeric film 14 tightly seals each cavity, so that the top of each cavity is held generally flat, by its own tension, in the absence of any voltage applied to the electrodes in the cavities.

Figure 5:
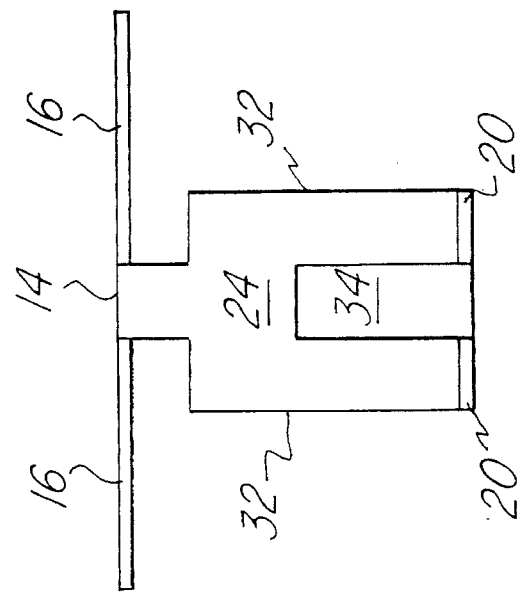
FIG. 5 is a cross-sectional side view of a fourth embodiment of a gel cavity.

FIG. 5 illustrates another modification to the design of the cavity. The cavity 24 has a smaller cylinder at the top than at the bottom, with a metallic side wall 32 serving as one electrode and another metal object 34 attached to the floor of the cavity as the other electrode. An insulator 16 surrounds the cavity on the surface. The electrode attached to the floor of the cavity is cylinder shaped 34 surrounded by an insulator 20. A thin elastomeric film 14 tightly seals each cavity, so that the top of each cavity is held generally flat, by its own tension, in the absence of any voltage applied to the electrodes in the cavities.

Figure 6:
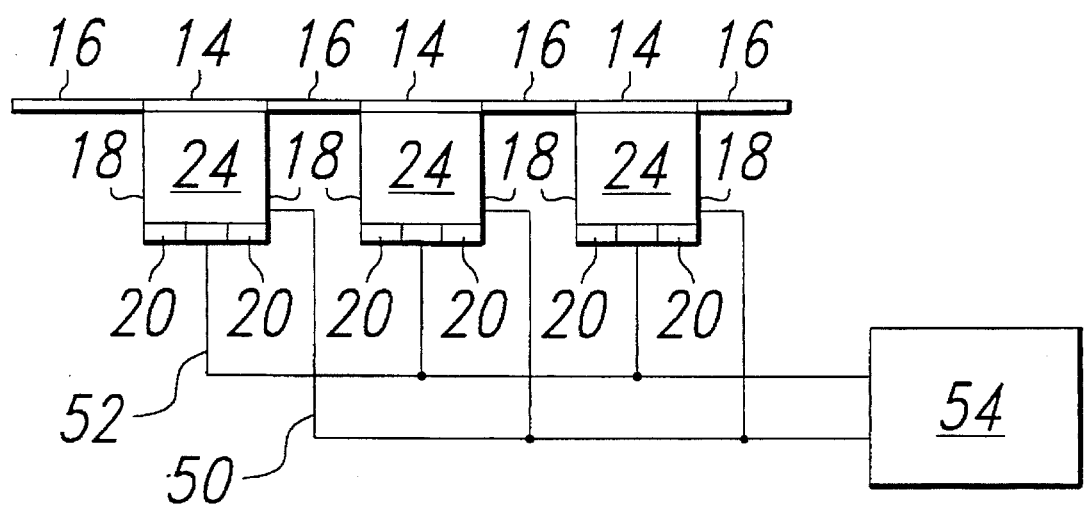
FIG. 6 is a cross-sectional side view of three of the gel cavities of the first embodiment attached to electronic means.

FIG. 6 is a cross-sectional side view of three of the gel cavities of the first embodiment attached to electronic means. As in FIG. 2, each cavity 24 is cylindrical, with a metallic side wall 18 serving as one electrode and another metal object 22 attached to the floor of the cavity as the other electrode. The gel cavity 24 is about 1.5 mm in diameter and about 1.0 mm in depth. An insulator 16 surrounds the cavity on the surface. The electrode attached to the floor of the cavity is a flat metal disc 22 surrounded by an insulator 20. A thin elastomeric film 14 tightly seals each cavity, so that the top of each cavity is held generally flat, by its own tension, in the absence of any voltage applied to the electrodes in the cavities. Each of the electrodes 22 attached to the floor of the cavities are attached to line 52 which connects to the electronic means 54. Each of the metallic side wall electrodes 18 are attached to line 50 which connects to the electronic means 54. In addition, any of the other embodiments may also be similarly attached to the electronic means 54.

The gel filling is a small quantity of polar organic gel sensitive to electric fields. Each cavity is individually addressable by electronic means. When voltage is applied to the electrodes in a cavity, the gel in that cavity expands sufficiently to raise a dimple in the elastomeric film.

Several polar organic gels are feasible for implementation: poly(isopropylacrylamide), poly(acrylamide), poly(vinyl alcohol), and poly(N-propylacrylamide). These gels are not meant to limit the present invention, and are used only as an illustration to possible implementations.

This invention can be at least two orders of magnitude lower, in both cost and power consumption, than any comparably-sized display attempted with any other currently-used technology. It is potentially superior in reliability and product life span, because its only moving parts are gel polymer molecules and pieces of elastomeric film. It is also as easily software-programmable as the bit-mapped video displays currently used by the sighted. This invention therefore can produce large and flexible tactile displays affordable by individuals as well as by businesses and educational institutions.

Under embedded software control, this invention can: switch among Grade 1 English, Grade 2 English, and foreign language Braille characters, while students are in the process of acquiring basic literacy. The invention can also "highlight", (by tangibly vibrating dots), characters or words important to spelling and grammar lessons. Additionally, the invention will allow more sophisticated students or users to define and use their own personally-customized Grade 3 Braille character sets.

Special implementations of this invention may also be constructed for special needs. A "large dot" version of the display for persons with reduced fingertip sensitivity (e.g., diabetics or the elderly) can be created. In addition, the invention allows low-cost add-ons for devices for telephone communication by the deaf-blind.

This invention can, for the first time, make Braille text and tactile graphics widely and inexpensively available from a variety of sources currently inaccessible to the blind. The effect of this is to significantly increase the motivation for a blind person to learn Braille, for general literacy and employment opportunities. As the number of Braille readers increases, the initial market for this invention "bootstraps" itself up to a larger size. A low-cost large-scale tactile display is a key technical development that can transform the membership of the blind community from a minority to a large majority of Braille readers.

While this invention has been described with reference to illustrative embodiments, this description is not intended to be construed in a limiting sense. The cavities are not limited to be cylindrical, and can be any other shape apparent to persons skilled in the art upon reference of the description. The electrodes may also be modified, and are not limited to the specific embodiments described. Other various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A Braille display device which comprises:

a plurality of polar organic gel cavities with a positive and a negative electrode, wherein said plurality polar organic gel cavities are between 1 and 2 millimeters in diameter and between 0.5 and 1.5 millimeters in depth, and wherein said polar organic gel is sensitive to electric fields and each one of said cavities is individually self-contained and wherein said polar organic gel changes in volume with a change in electric field; and circuitry to individually excite said plurality of gel cavities.

2. The device of claim 1, wherein said device further includes circuitry to vibrate a portion of said plurality of polar organic gel cavities.

3. The device of claim 2, wherein said polar organic gel is selected from the group of: poly(isopropylacrylamide); poly(acrylamide); poly(vinyl alcohol); and poly(N-propylacrylamide).

4. The device of claim 1 wherein said plurality of polar organic gel cavities are sealed by an elastomeric film and said elastomeric film covering any gel cavity is held generally flat, by its own tension, in the absence of any voltage applied to the electrodes in said gel cavity.

5. The device of claim 1, wherein said device further includes circuitry to determine whether said cavity has been touched by the person reading the display.

6. A gel cavity for creating a protrusion from the surface of said cavity, said gel cavity having a bottom, walls and a top enclosing said cavity, said cavity between 1 and 2 millimeters in diameter and between 0.5 and 1.5 millimeters in depth, said cavity comprises of:

an electrode at said bottom;

polar organic gel filling said cavity;

a metal wall surrounding said cavity;

an elastomeric film at said top enclosing said cavity;

a first insulator surrounding said cavity at said top of said cavity; and a second insulator surrounding electrode at said bottom of said cavity.

7. The device of claim 6, wherein said electrode comprises a flat metal disc.

8. The device of claim 6, wherein said electrode comprises a cone-shaped metal structure.

9. The device of claim 6, wherein said polar organic gel is selected from the group consisting of: poly(isopropylacrylamide); poly(acrylamide); poly(vinyl alcohol); and poly(N-propylacrylamide).

10. The device of claim 6, wherein said device further includes circuitry to determine whether said gel cavity has been touched by the person reading the display.

11. The device of claim 6, wherein said device further includes circuitry to vibrate said gel cavity.

\* \* \* \* \*

Dedication 5,580,251—Alan M. Gilkes; Marvin W. Cowens, both of Plano; Larry A. Taylor, North Richland Hills, all of Texas. ELECTRICONIC REFRESHABLE TACTILE DISPLAY FOR BRAILLE TEXT AND GRAPHICS. Patent dated Dec. 3, 1996. Dedication filed July 20, 1998, by the assignee, Texas Instruments Incorporated.

Hereby dedicates to the public all claims and the entire term of said patent.
*(Official Gazette,* October 20, 1998)